W. Gale,

Straw Cutter.

No. 2,127. Reissued Dec. 19. 1865.

Inventor Warren Gale

Witnesses Geo. W. Roberts

Alfred W. Taylor

N. PETERS, PHOTO-LITHOGRAPHER, WASHINGTON, D. C.

UNITED STATES PATENT OFFICE.

WARREN GALE, OF CHICOPEE FALLS, MASSACHUSETTS, ASSIGNOR TO WARREN GALE AND B. B. BELCHER.

IMPROVEMENT IN STRAW-CUTTERS.

Specification forming part of Letters Patent No. 31,001 dated December 18, 1860; Reissue No. 1,977, dated May 30, 1865; Reissue No. 2,127, dated December 19, 1865.

*To all whom it may concern:*

Be it known that I, WARREN GALE, of Chicopee Falls, in the county of Hampden, in the State of Massachusetts, have invented a new and improved mode of constructing and arranging the vibrating lever-knife, in combination and connection with the movable stationary blade or mouth-piece of "hand-lever hay, staw, and feed cutters;" and I do hereby declare that the following is a full and exact description thereof, reference being had to the accompanying drawings, making a part of this specification, and to the letters of reference thereon marked.

Figure 1:
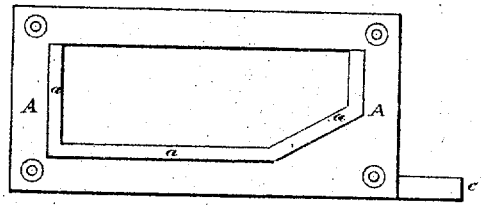
Figure 2:
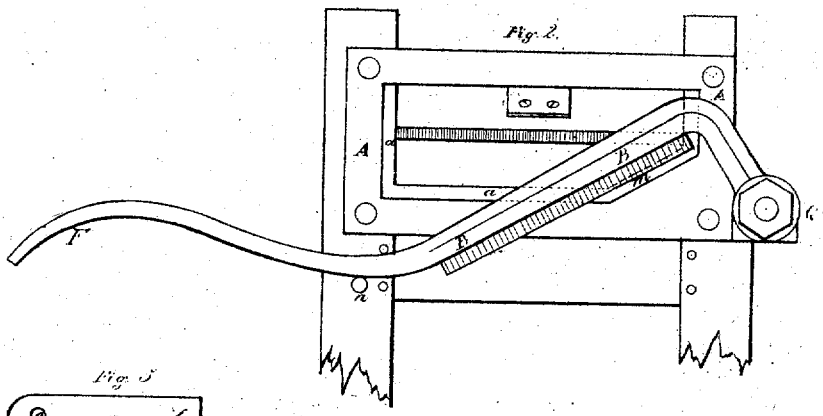
Figure 5:
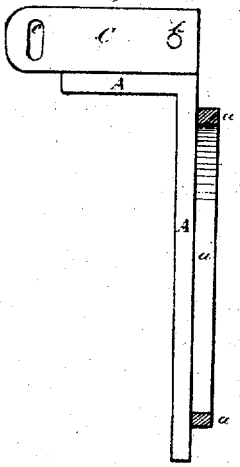
Figure 3:
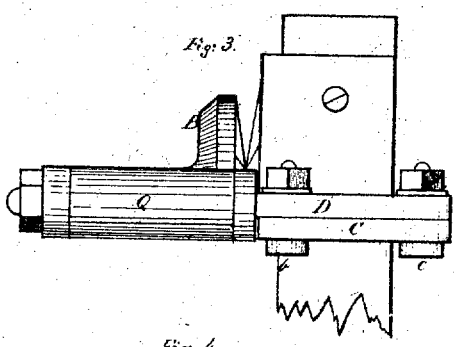
Figure 4:
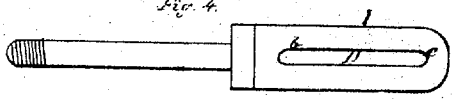

In the drawings, Figure 1 is a front elevation of the easily removable stationary blade or mouth-piece. Fig. 2 is a front elevation representing the stationary blade and vibrating lever-knife in position on the cutting-box frame. Fig. 3 is a side elevation of the parts as shown in Fig. 2. Fig. 4 is a plan view of the mouth-piece or stationary blade. Fig. 5 is a plan of the adjustable fixed pivot of the vibrating lever-knife.

Similar characters designate like parts in the several figures.

In instruments of this class for cutting fodder as heretofore constructed the pivot of the knife-lever (or the bearings of that pivot) has been secured to the wood-work of the cutter-box and has been separate and distinct from the stationary knife, which was a simple cutting-edge across the throat of the cutter-box. In machines of such construction the wood is always liable to swell and shrink with variations in the moisture of the atmosphere, thus causing frequent derangements of the cutting parts and unavoidably rendering the machine imperfect and difficult of operation, and even useless at times, as well as causing rapid destruction of parts by the interference of the chopping-knife with the edge of the stationary knife. The difficulties have also been increased by the want of proper and complete means of adjusting the chopping-knife in relation to the stationary knife so as to correct any possible disarrangement, and of permitting the knives to be easily sharpened when required.

The object of my invention is to remedy these defects and to more readily adjust the parts in the process of construction so as to cheapen the manufacture; and to this end the first feature of my invention consists in constructing the mouth-piece or stationary knife in such a manner that it shall at the same time serve as the throat and stationary blade of the cutter-box and as the bearing of the pivot of the chopping-knife lever, and be readily detachable from the cutter-box, (for grinding, repairing, or transportation,) without disconnecting from it or disarranging the knife-lever, which is directly attached to it by a metallic connection.

The second general feature of my invention consists in producing the capabilities of complete adjustment by means of the horizontal step or a step placed at or nearly at a right angle with the stationary knife, so as to allow of angular adjustment of the moving knife—that is, to allow either end of the moving knife to be set up to the stationary knife.

Another feature also consists in the peculiar mode of constructing the fastenings for holding the knife and adjusting it on the horizontal step, which may be directly attached to the mouth-piece or otherwise; but I prefer the direct attachment.

The parts to which my improvements relate may be mounted upon any suitable cutting-box frame or support It will be sufficient to indicate their connection, either permanently or removably, with an ordinary cutting-box, having bottom and side boards, supported on legs or frame-work, the bottom being inclined and the sides converging toward the cutting end, so as to compress the fodder for cutting, and the usual spring-top board for compressing the fodder downward, together with any suitable means of forcing or feeding the fodder to the knife. To the proper end of such a cutting-box the mouth-piece A is attached. This mouth-piece A is formed of cast-iron of a suitable rectangular shape to fit the smaller end (and serve as the throat) of the cutting-box, to which it is secured by a few screws, so that simply removing the screws enables me to remove the mouth-piece without at all weakening the wood-work of the cutter-box. The mouth-piece is cast so as to have a portion of it, A′, form a right angle, *x*, to fit the corner of the cutting-box, one or two screws securing the part A′ to the side of the cutting-box. I find that this is the simplest mode of constructing the mouth-piece that is consistent with rigidness of attachment; but I may dispense with the bent portion A′, or I may add another similar bent portion for the other side of the box, or the mouth-piece may be a simple plate. The center of the mouth-piece is left open, so as to form the throat *z*. The projecting inner edges, *a a a*, of the throat are properly ground or dressed, so as to form the stationary knife. Upon one end of the mouth-piece A, I form a metallic projection C, being either cast with, in one piece, or as a separate piece immovably secured to, the mouth-piece. This projection serves as a step or carrier for the pivot of the moving knife, and provides the desired metallic connection between the said pivot and mouth-piece without any wood intermediate between the two, and this is a most desirable way, although I do not confine the metallic connection between the said parts to the employment of such a carrier. A convenient form of this carrier is indicated in the drawings, and it thereby furnishes a ready and proper means for applying my improved adjustments, substantially as follows: The knife-pivot D is provided with a flange, which extends over and rests upon the carrier C, to which it is secured by two screw-bolts or their equivalents, as seen at *c*, Fig. 3. These bolts extend through a longitudinal slot or slots in the pivot-flange, as shown in Fig. 4, and respectively through the round bolt-hole *b*, and transverse oblong aperture or slot *c* in the carrier, as seen in Fig. 5, the hole *b* being next to the face of the mouth-piece. The longitudinal slot of the pivot-flange allows the pivot carrying the moving or chopping knife to be adjusted either directly toward or from the mouth-piece, as required, while the transverse slot *c* in the carrier allows the pivot-flange to turn in the arc of a circle around the bolt in the hole *b* as the center, thereby causing the chopping-knife to be angularly adjusted in respect to the mouth-piece, so as to touch equally the entire edges *a a a*, along the whole length of the knife-edge. When the adjustments have been thus accurately accomplished, the screw-bolts are tightened, clamping the carrier C and the pivot-flange securely together. The longitudinal slot may be in the carrier C, and the bolt-hole and transverse slot may be in the pivot-flange, if desired, the effect being the same as in the manner described. By substantially this or equivalent means I get the important angular and distance adjustments required for the successful operation of the instrument, and thus all the defects enumerated as incident to the use of the knife lever straw-cutter as previously existing are completely obviated without adding to the cost or increasing the complexity of the machine, which can always be kept in repair with only the expenditure of the little time required in the sharpening and adjusting of the cutting-edges.

The knife-lever F, which is generally made of cast-iron, has a long fulcrum-socket, Q, to receive the pivot D, so as to give firmness and steadiness of action to the knife *m*, which is secured to the part B of the lever by short countersunk screws or rivets. The lever is formed with a bend at the pivot end, and so arranged in relation to the cutting-edges *a a a* as to give a gradual shear-cut, substantially as shown. The other end of the lever extends past the end of the cutting-box and so formed as to be a handle to be grasped by the hand and be raised up and down when chopping. Its downward motion is limited by a stop, *n*, Fig. 2.

The advantages of my improvement are very important, for they secure great ease and perfection of operation, as well as durability and strength, by allowing the cutting-edges to be repeatedly ground and adjusted to each other until entirely worn out.

The metallic connection, without intervening wood, between the cutting parts and their ready removability in a body from the cutting-box or frame, without disconnecting the two knives, or disarranging their adjustments and relations of parts, are also of peculiar value, enabling the metallic parts to be readily applied to or removed from any suitable cutting-box by means of a few screws, to be readily detached, for repairs or transportation, from the cutting-box, thus cheapening and facilitating transportation, as well as allowing them to be put together and adjusted properly, and then be applied by any one to any cutting-box or support, so as to frequently save the cost of the box or frame, and so that any one, however unskilled, may put the implement in working order.

I am aware that a detachable mouth piece, serving also as the stationary knife, and as a guiding-groove to the moving-knife is shown in Joshua Moore's patent of December 23, 1834; but this mouth-piece is constructed and attached in a manner quite different from mine, and does not at the same time serve as the bearing for a pivot of a lever-knife. In view of this case I wish it to be understood that I do not broadly claim any or all kinds of detachable mouth-pieces, but only such detachable mouth-pieces as are substantially equivalent in construction and operation to the mouth-piece herein described.

I am also aware that the patents of E. Taylor, October 12, 1844; of Lucius Leavenworth, October 11, 1859, and of J. J. Richardson, of April 10, 1843, each exhibit a metallic mouth-piece serving as a stationary knife, and metallically connected to the moving knife; and in view of these cases I do not broadly claim any or all combinations of the three elements of a metallic mouth-piece serving as stationary knife, a moving knife, and a metallic connection, but limit my claim to the combination of the said elements when both the detachable mouth-piece and the bent lever-knife are constructed and operated substantially as described, and are metallically connected together.

The chief advantages of my invention are the portability and adaptability to any box or support of the co-operative and combined mouth-piece, lever-knife, and metallic connection and the horizontal step for getting angular adjustment.

What I claim as my invention, and desire to secure by Letters Patent, is—

1. The mouth-piece A, constructed and attached substantially as described, and provided with a cutting-edge, *a*.

2. The combination and arrangement of the mouth-piece A, constructed substantially as described and claimed, with the lever-knife F B, constructed and operating substantially as described.

3. The step C, constructed and operating substantially as described, when used as a support for the chopping lever-knif F B, and its fastenings, for the purpose of obtaining angular adjustment.

4. The combination and arrangement of the carriers C and the flange of the pivot D, provided, respectively, with the longitudinal slot and with the bolt-hole *b*, and transvere slot *c*, for producing the adjustments desired, substantially as herein specified.

In testimony that I claim the above I have affixed my signature this 21st day of August, 1865.

Witnesses: WARREN GALE.

A. HUBBARD,

JO C. CLAYTON